United States Patent [19]

Stephenson

[11] 4,190,267
[45] Feb. 26, 1980

[54] PASSIVE SEAT BELT SYSTEM

[75] Inventor: Robert L. Stephenson, Sterling Heights, Mich.

[73] Assignee: Allied Chemical Corporation, Morris Township, Morris County, N.J.

[21] Appl. No.: 923,854

[22] Filed: Jul. 12, 1978

[51] Int. Cl.² .............................................. B60R 21/10
[52] U.S. Cl. ..................... 280/803; 280/804; 297/469
[58] Field of Search ............... 280/745, 747, 744, 746; 297/389, 388, 387, 386, 385

[56] References Cited

U.S. PATENT DOCUMENTS

| | | | |
|---|---|---|---|
| 3,830,518 | 8/1974 | Silber | 280/745 |
| 3,833,239 | 9/1974 | Coenen | 280/745 |
| 3,899,191 | 8/1975 | Royce | 280/745 |
| 4,004,821 | 1/1977 | Breitschwerdt et al. | 280/744 |
| 4,004,829 | 1/1977 | Kato et al. | 297/388 X |

Primary Examiner—Joseph F. Peters, Jr.
Assistant Examiner—Milton L. Smith
Attorney, Agent, or Firm—Roger H. Criss

[57] ABSTRACT

A passive seat belt restraint system including a seat belt having one end connected to a vehicle door and the other end connected to the vehicle on the opposite side of a seat adjacent the door. The seat belt is moved along a track which is located in the console and in the dashboard in front of the seat. A hook member is movable in the console track and supports the seat belt when the belt is in its forward position. A buckle is movable in both the console and the dashboard tracks and is attached to the belt to form shoulder and lap belts. The buckle is moved to a position closer to the door to permit easy entry to and exit from the seat.

10 Claims, 3 Drawing Figures

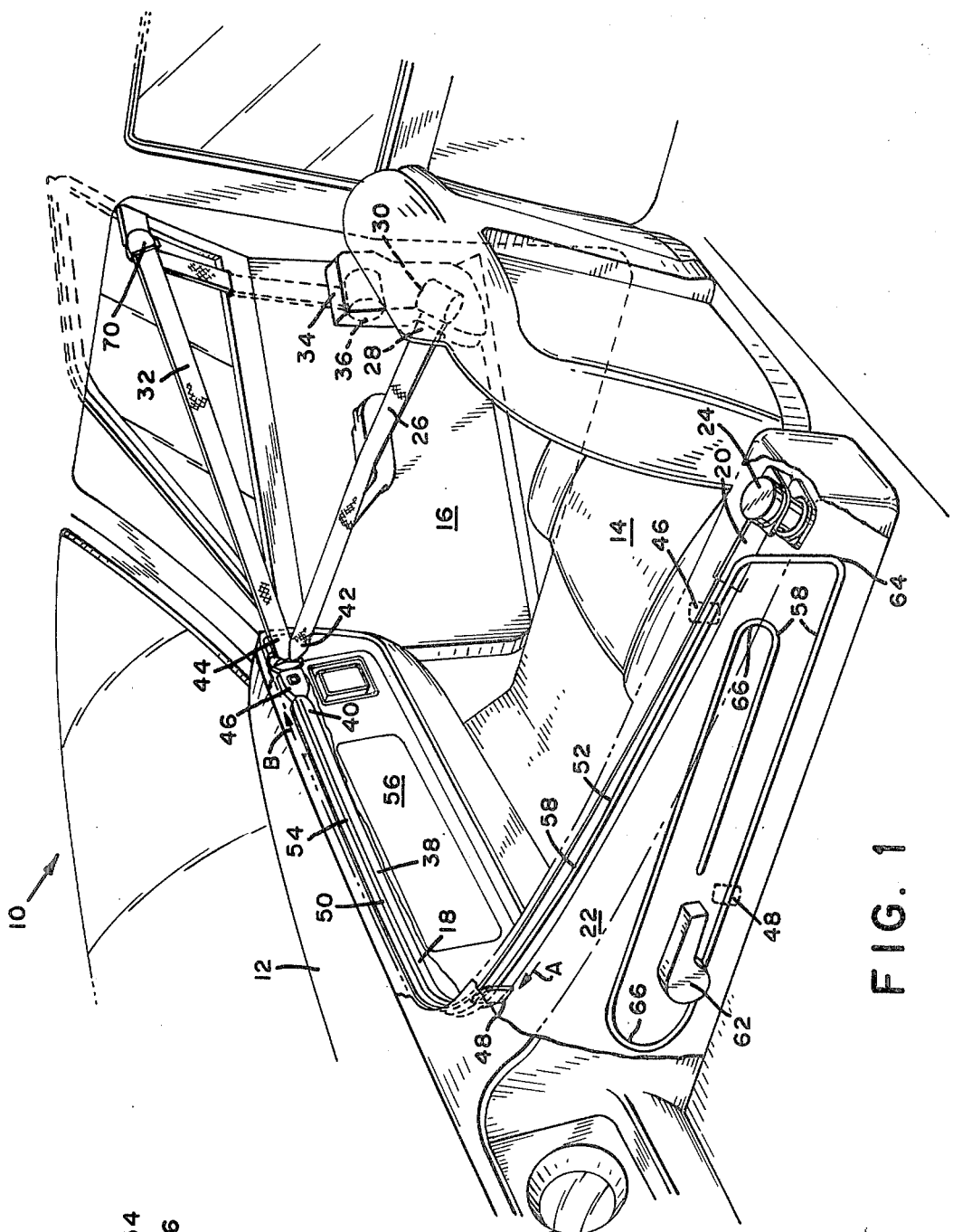
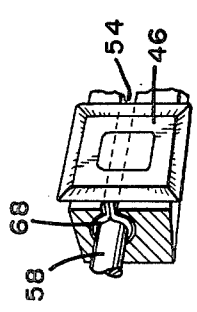
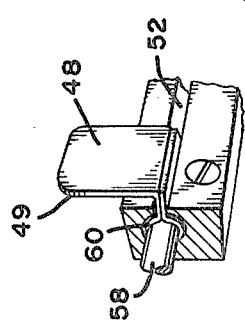

PASSIVE SEAT BELT SYSTEM

BACKGROUND OF THE INVENTION

1. Field of the Invention

This invention relates to improvements in passive seat belt systems for vehicle occupants.

2. Description of the Prior Art

Passive seat belt systems, especially for automobile occupants, in which a seat belt restraint automatically moves into position about the occupant, have previously been suggested. Typically, such a system is actuated upon closing of the vehicle door although other actuating conditions have been proposed. By "passive" seat belt system is meant that the seat belt is automatically positioned about the occupant prior to movement of the vehicle; these systems are in distinction to the typical "active" seat belt system which includes belt webbing connected to a tongue or like device which must be actively fastened by the occupant to a cooperating seat belt buckle or the like.

Passive seat belt systems have been proposed wherein a single belt is positioned around the torso of the occupant or alternatively wherein a combination of lap and shoulder belts are utilized.

One problem associated with previous systems is that the belts do not move sufficiently out of the way when the door is opened or other actuating condition occurs so as to permit convenient and comfortable ingress to and egress from the vehicle.

SUMMARY OF THE INVENTION

In accordance with this invention, there is provided a passive seat belt restraint system comprising:

a seat belt adapted for restraining an occupant positioned in a seat in the vehicle;

the seat belt having a first end connected to a door of the vehicle adjacent to the seat and a second end connected to the vehicle at the side of the seat opposite the door;

at least one of the first and second ends being connected to the vehicle through a seat belt retractor;

track means comprising a first portion mounted in the vehicle at a location adjacent to the other side of the seat, the first portion extending from a point adjacent to the rear of the seat to the dashboard of the vehicle located in front of the seat, and a second portion provided in the dashboard and extending from the first portion towards the door, the first and second portions being in communication with each other;

seat belt support means movable in at least the first portion of the track means, such means supporting the seat belt at a first location at least when the seat belt is in a non-restraining position;

connecting means connecting the seat belt to the track means and located in the track means at a second location which is closer to the door than the first location when the seat belt is in a non-restraining position, the connecting means being movable along the first and second portions of the track means; and means for moving the seat belt support means and the connecting means from a first position at which the seat belt is in position to restrain the occupant, to a second position at which the seat belt is in a non-restraining position, thereby permitting easy ingress to and egress from the seat.

It has been found that the passive restraint system of this invention provides increased ease of entry to and exit from the vehicle since the seat belt is moved to an extreme forward position when the door is opened or other actuating condition occurs, with the lap and shoulder portions in close proximity to the door and the connecting portion located against the dashboard and adjacent to the side of the seat opposite the door.

BRIEF DESCRIPTION OF THE DRAWING

FIG. 1 is a perspective view of the passive seat belt restraint system of this invention for the passenger's position.

FIG. 2 is a view taken along arrow A of FIG. 1.

FIG. 3 is a view taken along arrow B of FIG. 1.

DESCRIPTION OF THE PREFERRED EMBODIMENTS

With reference to the drawing, the passive seat belt system of this invention, generally indicated at 10 in vehicle 12 having a seat 14 adjacent to door 16, includes a seat belt 18 attached at a first end to door 16 and at its second end 20 to the vehicle at the side of seat 14 opposite door 16. Second end 20 may be affixed to the vehicle in console 22 located above the transmission shaft or directly to the vehicle floor. Preferably, second end 20 is connected to vehicle 12 by a conventional seat belt retractor 24 preferably located in console 22.

Seat belt 18 preferably includes a lap portion 26 having a first end 28 connected to door 16, preferably through a seat belt retractor 30, a shoulder portion 32 having a first end 34 connected to door 16, preferably through a seat belt retractor 36 and a connecting portion 38 having a first end (corresponding to second end 20 of seat belt 18) and a second end 40. Second end 40 of connecting portion 38 communicates with second ends 42 and 44 of lap portion 26 and shoulder portion 32, respectively, through a connecting means, preferably a releasable interconnection 46 in the form of a conventional buckle and tongue assembly. Releasable interconnection 46 provides a means of releasing seat belt 18 in case of an emergency. Retractors 24, 30 and 36 are preferably of the emergency locking type. Such retractors may be of the vehicle sensitive, web sensitive or both vehicle and web sensitive types. At least one of the connections to ends 20, 28 and 34 is in the form of a retractor and preferably each of said ends is connected to a retractor to facilitate movement of seat belt 18 with increased comfort to the occupant.

Seat belt support means 48 engages connecting portion 38 at a location intermediate its ends. Such means is preferably in the form of a hook having an open upper portion and having a generally L-shape (FIG. 2) and a belt engaging portion 49. Hook 48 is mounted for movement in a first portion 52 of track 50 provided on or adjacent to console 22. A second portion 54 of track 50 extends continuously from the end of first portion 52 along the dashboard 56 in front of seat 14. Hook 48 is connected to a cable or rod 58 guided for movement within track 50. Hook 48 is mounted to cable 58 by clamp 60 or by other suitable means. Track 50 and cable 58 preferably extend within the interior of console 22 to a reversible winding motor 62. Track portion 52 includes a U-shaped section 64 in console 22 adjacent to retractor 24. Preferably, console 22 is provided with an opening adjacent to U-shaped section 64 which is large enough to accomodate hook 48. Depending upon the amount of cable 58 necessary for the system, one or more additional U-shaped sections 66 may be provided in console 22.

Track portion 54 extends to a position adjacent to the door 16. Hook 48 is movable from a first position (restraining position) on track portion 52 within the interior of console 22 (shown in dotted lines) to a second position (non-restraining position) on track portion 52 adjacent to dashboard 56 and track portion 54 (shown in solid lines). If desired, buckle 46 may be movable on track portion 54 as well.

Buckle 46 or other connecting means is also connected to cable 58 either directly through a clamp 68 (FIG. 3) or through a intermediate ring (not shown). Buckle 46 is attached to cable 58 at a location which is closer to the door 16 than the attachment of hook 48 to cable 58 when the seat belt is in its non-restraining position. Buckle 46 is movable along track portions 52 and 54 from a first position (restraining position) adjacent to the rear of seat 14 at the side of seat 14 opposite door 16 (shown in dotted lines) to a second position (non-restraining position) adjacent to door 16.

An additional means may be provided to prevent lap portion 26 from rubbing against the occupant as seat belt 18 is being moved to its restraining position and also to maintain lap portion 26 and shoulder portion 32 adjacent to door 16 when belt 18 is in its non-restraining position. Such additional means may be in the form of a movable ring or hook, a lever or other suitable device. For example, a second track extending vertically upwards on the door may be provided. A second cable which is connected to a second reversible motor may be provided in the track and may have a movable ring associated therewith through which lap portion 26 extends. The ring is movable vertically upwards to lift lap portion 26 away from the occupant as the belt is moved towards its non-restraining position.

To provide the desired angular relationship of shoulder portion 32, preferably the seat belt extends from retractor 36 mounted on door 16 through a run through bracket 70 fixed on door 16 at a location above the height of the occupant's shoulder when sitting in seat 14.

In operation, when door 16 is closed, hook 48 is located in its dotted line position within console 22 at which it does not support connecting portion 38 of seat belt 18. Buckle 46 is located in its dotted line position adjacent seat 14. Lap portion 26 and shoulder portion 32 are in their restraining positions surrounding seat 14. Upon actuation of motor 62, which may result from the opening of door 16 as detected by a microswitch in the jamb or front pivot point of door 16 or by any other desired condition, cable 58 is extended from motor 62 and hook 48 is moved rearward along track portion 52 within console 22. As hook 48 passes around U-shaped section 64 of track portion 52 and emerges from console 22, its belt engaging section 49 engages connecting portion 38 of seat belt 18. Hook 48 is then moved forward along track portion 52 to its solid line position adjacent to dashboard 56. At the same time, buckle 46 is moved forward along track portion 52 and thence along track portion 54 towards door 16 to its solid line position. Due to the motion of buckle 46, seat belt webbing is being extended from retractor 24. After buckle 46 transfers from track portion 52 to track portion 54, excess webbing is rewound on retractors 30 and 34 and lap portion 26 and shoulder portion 32 are located closely adjacent to door 16 when buckle 46 reaches its limit of travel.

In the non-restraining position, both lap portion 26 and shoulder portion 32 are closely adjacent door 16 and buckle 46 is located on track portion 54 adjacent to door 16. A part of connecting portion 38 extends parallel to track portion 52, with the remainder of connecting portion 38 extending from a forward part of console 22 to a buckle 46 in track portion 54. It will be appreciated that in the non-restraining position, there is a maximum area of non-interference by seat belt 18 which permits ready ingress to and egress from seat 14 by the occupant.

When door 16 is closed (or other actuating condition occurs), motor 62 causes reverse movement of cable 58, with hook 48 and buckle 46 moving towards their restraining positions. Buckle 46 travels first along track portion 54 and then at a right angle along track portion 52 towards a position adjacent to seat belt retractor 24. Excess webbing associated with connecting portion 38 is wound up on retractor 24. At the same time, webbing is extended from retractors 36 and 30 to provide additional length of shoulder portion 32 and lap portion 26, respectively, until buckle 46 has moved onto track portion 52, at which time excess webbing is rewound on retractors 34, 30 and 24. Hook 48 moves rearward along track portion 52 and prior to entering the interior of console 23, it releases seat belt 18. Hook 48 then moves around U-shaped section 64. When hook 48 and buckle 46 have moved to their rearward, restraining positions, seat belt 18 is in position around seat 14, with buckle 46 lying adjacent to the lower rearward side of the seat 14.

In another embodiment, lap portion 26 and shoulder portion 32 may be attached to door 16 by a fixed connection, in which case an additional retractor is provided inboard to extend and retract such portions.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A passive seat belt restraint system comprising:
   a seat belt adapted for restraining an occupant positioned in a seat in said vehicle;
   said seat belt having a first end connected to a door of said vehicle adjacent to said seat and a second end connected to said vehicle at the side of said seat opposite said door;
   at least one of said first and second ends being connected to said vehicle through a seat belt retractor;
   track means comprising a first portion mounted in said vehicle at a location adjacent to said side of said seat, said first portion extending from a point adjacent to the rear of said seat to the dashboard of said vehicle located in front of said seat, and a second portion provided in said dashboard and extending from said first portion towards said door, said first and second portions being in communication with each other;
   seat belt support means movable in at least said first portion of said track means, said means supporting said seat belt at a first location at least when said seat belt is in a non-restraining position;
   connecting means connecting said seat belt to said track means and located in said track means at a second location which is closer to said door than said first location when said seat belt is in a non-restraining position, said connecting means being movable along said first and second portions of said track means; and means for moving said seat belt support means and said connecting means from a first position at which said seat belt is in position to restrain the occupant, to a second position at which said seat belt is in a non-restraining position, thereby permitting easy ingress to and egress from the seat.

2. The passive restraint system of claim 1 wherein said seat belt comprising a lap portion having a first end connected to said door and a second end, a shoulder portion having a first end connected to said door and a second end, said second ends being connected to each other at a location spaced from said door, and a connecting portion having a first end connected to said vehicle at the side of said seat opposite said door and a second end connected to said second ends of said lap and shoulder portions.

3. The passive restraint system of claim 2 wherein said connecting means comprises a releasable interconnection connecting said second ends of said lap and shoulder portions and said second end of said connecting portion of said seat belt.

4. The passive restraint system of claim 3 wherein said releasable interconnection comprises a buckle and tongue assembly.

5. The passive restraint system of claim 4 wherein at least one of said first ends of said lap and shoulder portions are connected to said door through a seat belt retractor.

6. The passive restraint system of claim 5 wherein both of said first ends of said lap and shoulder portions are connected to said door through a seat belt retractor.

7. The passive restraint system of claim 3 further including cable means movable in said track means and wherein said seat belt support means comprises a hook, said hook being connected to said cable, wherein said releasable interconnection is connected to said cable and said moving means comprises a reversible motor actuatable in response to opening and closing of said door.

8. The passive restraint system of claim 1 wherein said second end of said seat belt is connected to said vehicle through a seat belt retractor.

9. The passive restraint system of claim 1 wherein said seat belt support means comprises a hook.

10. The passive restraint system of claim 1 including cable means movable in said track means by said moving means.

* * * * *